United States Patent
Skoog et al.

(10) Patent No.: US 9,872,434 B2
(45) Date of Patent: Jan. 23, 2018

(54) ARTICULATED RIDER COLLECTION ASSEMBLY

(71) Applicant: HUSQVARNA AB, Huskvarna (SE)

(72) Inventors: Erik Skoog, Huskvarna (SE); Magnus Claesson, Jönköping (SE); Andreas Hedqvist, Jönköping (SE); Martin Robertsson, Jönköping (SE); Andreas Hultgren, Nässjö (SE); Anders Tjädermark, Huskvarna (SE); Sture Lexén, Taberg (SE)

(73) Assignee: HUSQVARNA AB, Huskvarna (SE)

( * ) Notice: Subject to any disclaimer, the term of this patent is extended or adjusted under 35 U.S.C. 154(b) by 4 days.

(21) Appl. No.: 14/914,079

(22) PCT Filed: Aug. 27, 2014

(86) PCT No.: PCT/IB2014/064097
§ 371 (c)(1),
(2) Date: Feb. 24, 2016

(87) PCT Pub. No.: WO2015/028954
PCT Pub. Date: Mar. 5, 2015

(65) Prior Publication Data
US 2016/0198630 A1    Jul. 14, 2016

Related U.S. Application Data (60) Provisional application No. 61/871,091, filed on Aug. 28, 2013, provisional application No. 61/878,658, filed on Sep. 17, 2013.

(51) Int. Cl.
*A01D 61/00*    (2006.01)
*A01D 43/063*    (2006.01)
(Continued)

(52) U.S. Cl.
CPC ............ *A01D 43/063* (2013.01); *A01B 76/00* (2013.01); *A01D 2101/00* (2013.01)

(58) Field of Classification Search
CPC ............ B60Y 2200/223; B60K 17/105; B60K 17/356; B60K 2007/0046; A01D 2101/00; A01D 43/063; A01D 43/0635
(Continued)

(56) References Cited

U.S. PATENT DOCUMENTS 2,848,862 A * 8/1958 Harrigan .............. A01D 43/063
56/199
3,222,853 A * 12/1965 Michael ............. A01D 43/0633
100/145

(Continued)

FOREIGN PATENT DOCUMENTS

DE    4336821 A1    10/1993
DE    19519146 A1    5/1995
(Continued)

OTHER PUBLICATIONS

International Search Report and Written Opinion of PCT/IB2014/064097 dated May 12, 2014.

*Primary Examiner* — Arpad Fabian-Kovacs
(74) *Attorney, Agent, or Firm* — McNair Law Firm, P.A.

(57) ABSTRACT

A lawn care device (10) may include an articulated frame (40), a cutting deck (50, 100), a collection container (12) and a chute (82). The articulated frame (40) may include a front frame portion (42) to which front wheels (34) are operably coupled and a rear frame portion (44) to which rear wheels (32) are operably coupled, the front frame portion (42) and rear frame portions (44) being operably coupled by an articulated joint. The cutting deck (100) may house at least one blade (110, 112, 114) and the cutting deck (100) may be mounted to the front frame portion (42), forward of the front wheels (34). The collection container (12) may collect
(Continued)

material from the cutting deck (50, 100) and may be affixed to the front frame portion (42) and suspended over the rear wheels (32). The chute (82) may be operably coupling the cutting deck (50, 100) and the collection container (12) to pass the material from the cutting deck (50, 100) to the collection container (12).

20 Claims, 7 Drawing Sheets (51) Int. Cl.
 *A01B 76/00* (2006.01)
 *A01D 101/00* (2006.01)
(58) Field of Classification Search
 USPC ........................................................ 180/235
 See application file for complete search history.

(56) References Cited

U.S. PATENT DOCUMENTS

| | | | | |
|---|---|---|---|---|
| 3,736,736 A | * | 6/1973 | Myers | A01F 15/00 |
| | | | | 15/78 |
| 3,865,208 A | * | 2/1975 | Crawshay | B60K 17/356 |
| | | | | 180/307 |
| 4,069,649 A | * | 1/1978 | Mullet | A01D 43/0633 |
| | | | | 56/14.5 |
| 4,262,475 A | * | 4/1981 | Takahashi | A01D 43/077 |
| | | | | 56/157 |
| 4,947,956 A | * | 8/1990 | Henline | B60K 17/356 |
| | | | | 180/235 |
| 4,986,062 A | * | 1/1991 | Hill | A01D 43/0633 |
| | | | | 56/16.9 |
| 6,732,828 B1 | * | 5/2004 | Abend | A01D 34/63 |
| | | | | 180/242 |
| 6,845,837 B2 | * | 1/2005 | Ohashi | B60K 7/0015 |
| | | | | 180/235 |
| 6,902,017 B2 | * | 6/2005 | Ohashi | A01D 69/03 |
| | | | | 180/233 |
| 7,389,847 B2 | * | 6/2008 | Sakikawa | A01D 69/03 |
| | | | | 180/235 |
| 7,455,144 B2 | * | 11/2008 | Ohashi | A01D 69/03 |
| | | | | 180/242 |
| 7,469,537 B2 | * | 12/2008 | Tsukamoto | B60K 17/105 |
| | | | | 60/328 |
| 7,540,349 B2 | * | 6/2009 | Ohashi | B60K 17/105 |
| | | | | 180/233 |
| 7,654,478 B1 | | 2/2010 | Lehmann | |
| 7,896,123 B2 | * | 3/2011 | Ohashi | B60K 7/0015 |
| | | | | 180/242 |

FOREIGN PATENT DOCUMENTS

| | | | | |
|---|---|---|---|---|
| DE | 102006040132 A1 | | 3/2007 | |
| DE | 102011002036 A1 | * | 10/2012 | ............ A01D 34/49 |
| EP | 1135981 A2 | | 9/2001 | |
| EP | 2505051 A1 | | 10/2012 | |
| JP | 2000270651 A | * | 10/2000 | ............ A01D 34/63 |
| WO | 2013052027 A2 | | 4/2013 | |

* cited by examiner

ARTICULATED RIDER COLLECTION ASSEMBLY

TECHNICAL FIELD

Example embodiments generally relate to outdoor power equipment and, more particularly, some embodiments relate to an articulated riding lawn mower with a collection assembly.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

Given that riding lawn mowers have the ability to provide a platform capable of hosting functional accessories, they can be very popular devices. However, the larger platform provided by a riding lawn mower may require sacrifices in maneuverability. Accordingly, it is desirable to develop riding lawn mower configurations that effectively balance considerations like size and corresponding functional capability that can therefore be supported with maneuverability.

BRIEF SUMMARY OF SOME EXAMPLES

Some example embodiments may provide an articulated riding lawn mower configuration that has superior maneuverability, while also providing a robust collection capability. Moreover, some embodiments may also provide an auger assembly that serves to facilitate the collection capability. The auger assembly may be integrated into the system in a number of different configurations where the auger assembly supplies collected materials from a front mounted cutting deck into a container that is suspended above a rear articulating section. Operators may therefore take fuller advantage of the capabilities of their lawn mowers, and have a greater satisfaction with the performance of their lawn mowers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, a lawn mower is provided that employs an articulated riding lawn mower configuration to provide improved maneuverability. In this regard, a rear wheel assembly of the mower is connected to the main chassis via an articulated joint. The lawn mower includes a front mounted cutting deck that is forward of the front wheels of the mower and the cutting deck feeds an auger assembly that facilitates transportation of clippings or debris generated from the cutting deck to a collection container that is suspended above the rear wheel assembly of the mower. The articulated rear wheel assembly is therefore able to move beneath the suspended collection container to improve mobility, while the collection container is maintained in a fixed orientation relative to the cutting deck and front wheels so that the auger assembly can provide efficient and powerful conveyance of the clippings to the collection container.

Cutting vegetation in certain conditions (e.g., moist environments, tall grass or tough varieties of vegetation) may generally make it more likely that the clippings can get clogged within the chute that feeds the clippings from the cutting deck to the collection container (e.g., bagging attachment). The auger assembly can transport the clippings from the cutting deck area to the collection container while preventing clogging. In this regard, the continuous rotation of the auger may keep the chute clean and may also compress the clippings so that the capacity of the collection container is effectively increased. Operators may therefore take fuller advantage of the capabilities of their lawn mowers, and have a greater satisfaction with the performance of their lawn mowers.

Figure 1:
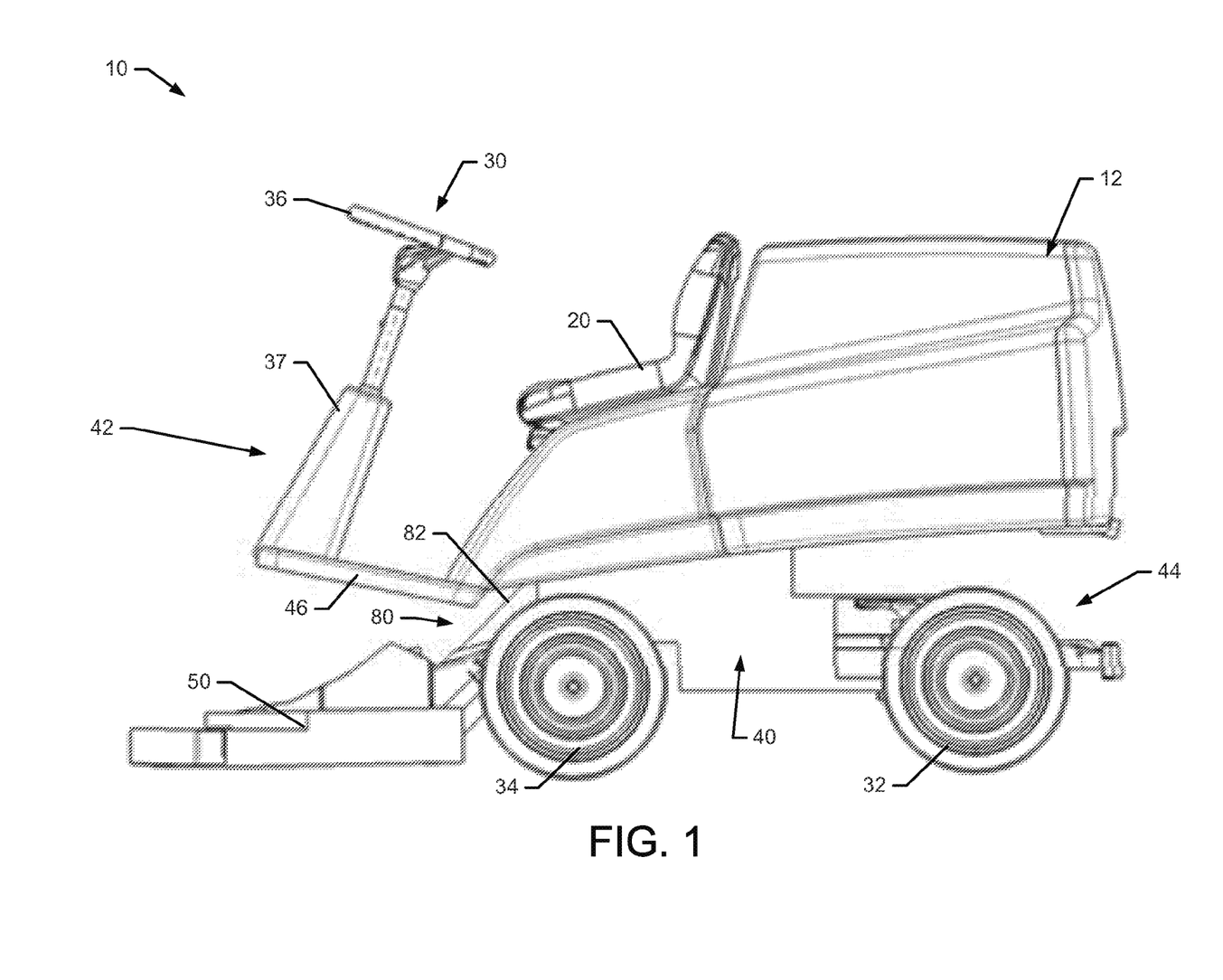
FIG. 1 illustrates a side view of a riding lawn care vehicle according to an example embodiment.

FIG. 1, which includes FIGS. 1A and 1B, illustrates an example of a riding lawn care vehicle 10 having a bagging attachment 12. The bagging attachment 12 may be hard or soft sided. As such, the bagging attachment 12 may not necessarily be a "bag." Thus, the bagging attachment 12 is merely a collection container, regardless of construction, that is configured to collect lawn clippings or other discharge or debris that is ejected as a result of the operation of the riding lawn care vehicle 10. In some embodiments, the bagging attachment 12 may be removed or pivoted manually by the operator to dump the contents from the bagging attachment 12 when desired. However, in other embodiments, an automated dump system may be employed so that the bagging attachment 12 may be emptied without the operator needing to lift or otherwise physically contact the bagging attachment 12.

In some embodiments, the riding lawn care vehicle 10 may include seat 20 that may be disposed generally at a center portion of the riding lawn care vehicle 10. The riding lawn care vehicle 10 may also include a steering assembly 30 (e.g., a steering wheel, handle bars, or the like) functionally connected to the wheels of the riding lawn care vehicle 10 to which steering inputs are provided. In some cases, the steering inputs may be provided to rear wheels 32 of the riding lawn care vehicle 10 to allow the operator to steer the riding lawn care vehicle 10. In embodiments in which steering control is provided to the rear wheels 32, the front wheels 34 may not receive steering inputs in some embodiments. However, in alternative embodiments, steering controls could be initiated by providing steering inputs to the front wheels 34 or to both the front wheels 34 and the rear wheels 32.

In an example embodiment, the steering assembly 30 may include a steering wheel 36 and a steering column 37. The steering column 37 may operably connect to additional steering assembly components that are used to facilitate steering of the riding lawn care vehicle 10. The riding lawn care vehicle 10 may also include additional control related components (not shown) such as one or more speed controllers, cutting height adjusters and/or cutting unit lifting controllers. Some of these controllers may be provided in the form of foot pedals that may sit proximate to a footrest 46 (which may include a portion on both sides of the riding lawn care vehicle 10 (e.g., on opposite sides of the steering column 37)) to enable the operator to rest his or her feet thereon while seated in the seat 20.

In some example embodiments, the steering assembly 30 may be embodied as an assembly of metallic or other rigid components that may be welded, fitted, bolted or otherwise operably coupled to each other and coupled to the wheels (rear wheels 32 in this example) of the riding lawn care vehicle 10 to which steering inputs are provided. For example, the steering assembly 30 may include or otherwise be coupled with a steering cable assembly or a system of mechanical linkages to translate rotational motion applied to the steering assembly 30 (and more particularly to the steering wheel 36) into directional inputs to orient the wheels (e.g., rear wheels 32) accordingly. In the illustrated embodiment, the riding lawn mower has an articulated frame 40 where the front wheels 34 are rotatably mounted to a front frame portion 42 and the rear wheels 32 are rotatably mounted to a rear frame portion 44. The rear frame portion 44 and the front frame portion 42 may be joined at articulated joint 48 so that the rear frame portion 44 can pivot with respect to the front frame portion in response to steering input in order to reorient the rear wheels 32 relative to the front wheels 34. Other steering control systems may be employed in some alternative embodiments.

The riding lawn care vehicle 10 may also include, or be configured to support attachment of, a cutting deck 50 having at least one cutting blade mounted therein. The cutting deck 50 may be a removable attachment that may be positioned in front of the front wheels 34 in a position to enable the operator to cut grass using the cutting blade when the cutting blade is rotated below the cutting deck 50 and the cutting deck 50 is in a cutting position. When operating to cut grass, the grass clippings may be captured by a collection system, mulched, or expelled from the cutting deck 50 via either a side discharge, center discharge or a rear discharge to a collection container such as the bagging attachment 12.

Figure 2:
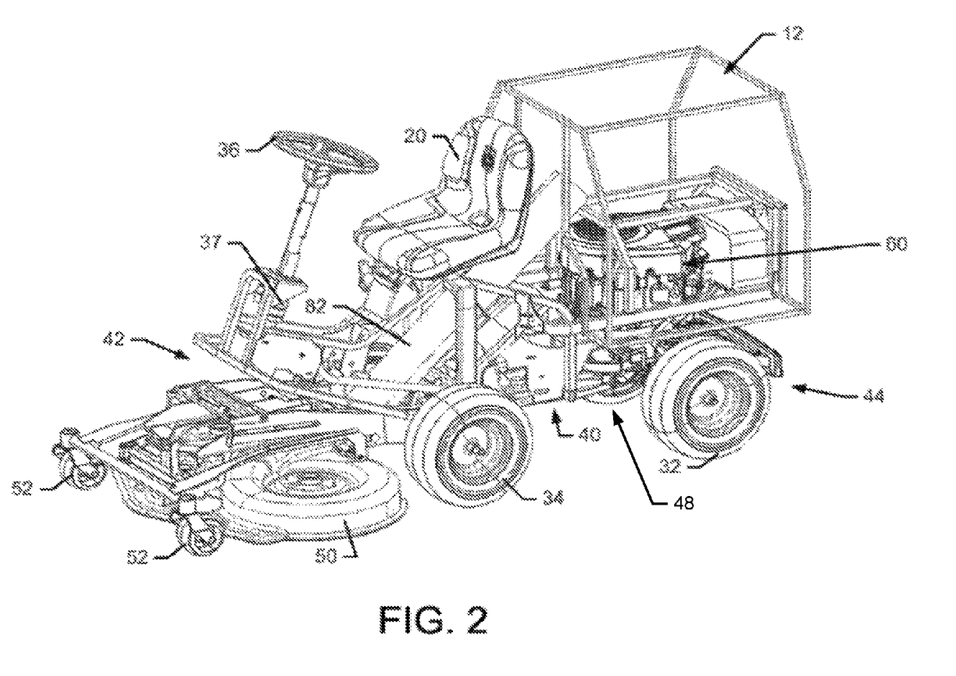
FIG. 2 illustrates a perspective view of the riding lawn care vehicle of FIG. 1 with body panels removed according to an example embodiment.
Figure 3:
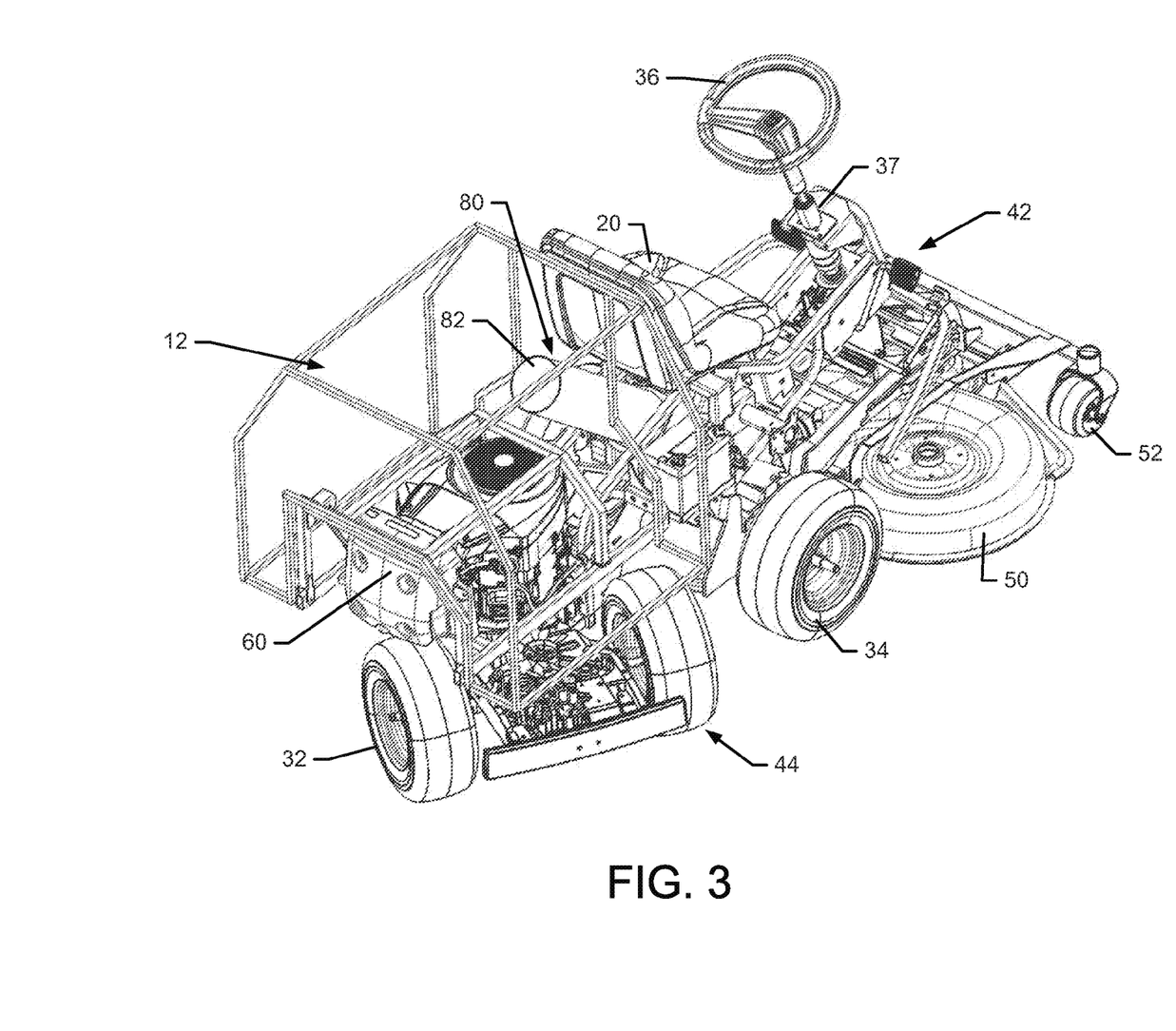
FIG. 3 illustrates a rear perspective view of the riding lawn care vehicle of FIG. 1 with body panels removed and with a rear articulating section shown positioned during a right turn according to an example embodiment.

In some embodiments, the cutting deck 50 may be elevated or lifted out of direct contact with the ground via a cutting unit lifting controller. In this regard, the cutting unit lifting controller may be a foot pedal or hand operated lever that operates linkages to lift or tilt the cutting deck 50 upward. Lifting the cutting deck 50 may enable the riding lawn care vehicle 10 to traverse certain rough terrain or obstacles (e.g., small rocks, curbs, or other features) or may otherwise be preferable for some operators when in a transit mode, or when the riding lawn care vehicle 10 is not actively being used in a cutting operation. However, other embodiments may not include any such cutting deck 50 lifting option, but may simply allow the height of blades within the cutting deck 50 to be adjusted using a cutting height adjuster. In this regard, the cutting height adjuster may be a lever that is operably connected to the blades via linkages (not shown) to adjust the height of the blades relative to the ground when the cutting deck 50 is lowered into a cutting position. In some embodiments, the cutting deck 50 itself may include wheels 52 to help ensure that the cutting deck 50 stays relatively level during operation to provide an even cut. The example of FIGS. 2 and 3 shows an embodiment in which the cutting deck 50 includes the wheels 52.

The cutting deck 50 may include blade drive components (e.g., belts, pulleys, a blade motor or other components) that may be used to functionally operate the cutting deck 50 during a cutting operation. The blade drive components may be powered by a motor 60 of the riding lawn care vehicle 10. The motor 60 may be an electric motor (e.g., battery powered) or may be a gasoline engine in some embodiments. The motor 60 may connect to the blade(s) of the cutting deck via the belt drive components responsive to selective engagement of a clutch assembly in some cases.

In some embodiments, the motor 60 may be attached to the front frame portion 42 and coupled to the rear wheels 32 (if applicable) through linkages, belts, pulleys, cables, etc., to power the rear wheels 32. As can be appreciated from the pictured example embodiment of FIGS. 1-3, the motor 60 may be housed underneath the bagging attachment 12 (e.g., in a cavity provided in a bottom portion of the bagging attachment 12). As such, the bagging attachment 12 may obscure the view of the motor 60 from sides of the riding lawn care vehicle 10. Accordingly, as can be seen from FIGS. 1-3, the bagging attachment 12 and the motor 60 may each be fixed to the rear of the seat 20. However, the bagging attachment 12 and the motor 60 may both be affixed to the front frame portion 42 so that they remain inline with the front frame portion 42 regardless of the articulated movement of the rear wheels 32 and the rear from portion 44. Accordingly, the riding lawn care vehicle 10 may be arranged to enable movement of the rear frame portion 44 (and rear wheels 32) not inline with the motor 60, the front frame portion 42 and the bagging attachment 12 during operation. Although the bagging attachment 12 is suspended over the rear wheels 32, the bagging attachment 12 does not rotate with the rear wheels 32 (or the rear from portion 44).

In an example embodiment, the motor 60, the steering assembly 30, the cutting deck 50, the seat 20 and other components of the riding lawn care vehicle 10 may be operably connected (directly or indirectly) to the frame 40 of the riding lawn care vehicle 10. The frame 40 may be a rigid structure configured to provide support, connectivity and interoperability functions for various ones of the components of the riding lawn care vehicle 10. As mentioned above, the frame 40 may be split or articulated such that, for example, the front wheels 34 are disposed on an opposite portion of the frame 40 than the portion of the frame on which the back wheels 32 are disposed with respect to an articulated joint 48 in the frame 40. The articulated joint may enable the riding lawn care vehicle 10 to exhibit a high degree of maneuverability. Accordingly, the riding lawn care vehicle 10 may be enabled to generate a relatively small uncut circle compared to other models when the riding lawn care vehicle 10 turns in a circle. Moreover, the riding lawn care vehicle 10 may be enabled to generate the small turn radius described above even at relatively higher speeds. Articulated steering, particularly in combination with rear wheel drive, may also provide excellent traction as compared to other models. However, it should be appreciated that all wheel drive models may also be provided.

The use of an articulated joint to connect the front frame portion 42 and the rear frame portion 44 can increase maneuverability. However, in the past, providing a front-mounted cutting deck would typically require that the clippings be discharged from the cutting deck and not collected. The attachment of a collection container to the rear frame portion 44 could be expected to generate complication and/or a propensity for the duct (which would need to be flexible to accommodate the articulated joint) to become clogged. Example embodiments may remedy this situation by taking advantage of the suspension of the bagging attachment 12 rigidly above the rear frame portion 44, but not on the rear frame portion 44. Instead, although suspended over the rear frame portion 44, the bagging attachment 12 is rigidly fixed or otherwise maintained inline with the front frame portion 42.

Accordingly, since the rear frame portion 44 is enabled to rotate as needed to accommodate improved maneuverability while the bagging attachment 12 does not rotate, a more robust assembly for transporting, conveying or otherwise moving clippings from the cutting deck 50 to the collection container (e.g., the bagging attachment 12) may be provided. In an example embodiment, an auger assembly 80 or belt conveyor assembly 400 (see FIG. 10) may be used to transport clippings from the cutting deck 50 to the bagging attachment 12. The auger assembly 80 or belt conveyor assembly 400 may provide a robust transport mechanism that can efficiently move clippings while avoiding clogs.

Generally speaking, the auger assembly 80 may employ a chute 82 that is operably coupled to a portion of the cutting deck 50 proximate to one end thereof and is operably coupled to a portion of the bagging attachment 12 at an opposite end thereof. The location of the opening through which clippings enter the chute 82 (i.e., the pickup point) relative to the housing of the cutting deck 50 may be different in respective different embodiments. As will be seen below, the pickup point could be in the front, back, middle, or side of the cutting deck 50. Similarly, the emptying point of the chute 82 into the bagging attachment 12 could be provided at different locations.

In an example embodiment, the chute 82 may extend substantially along a straight line from the pickup point to the emptying point to allow a single auger to extend along the axis of the chute 82. The auger may include a rotatable rod that may be rotated via power provided by the motor 60 and may include a helical blade extending radially outward from the rod to carry material in a general direction that is parallel to the axis of the auger as the material is carried up the rotating helical blade.

Figures 4, 5:
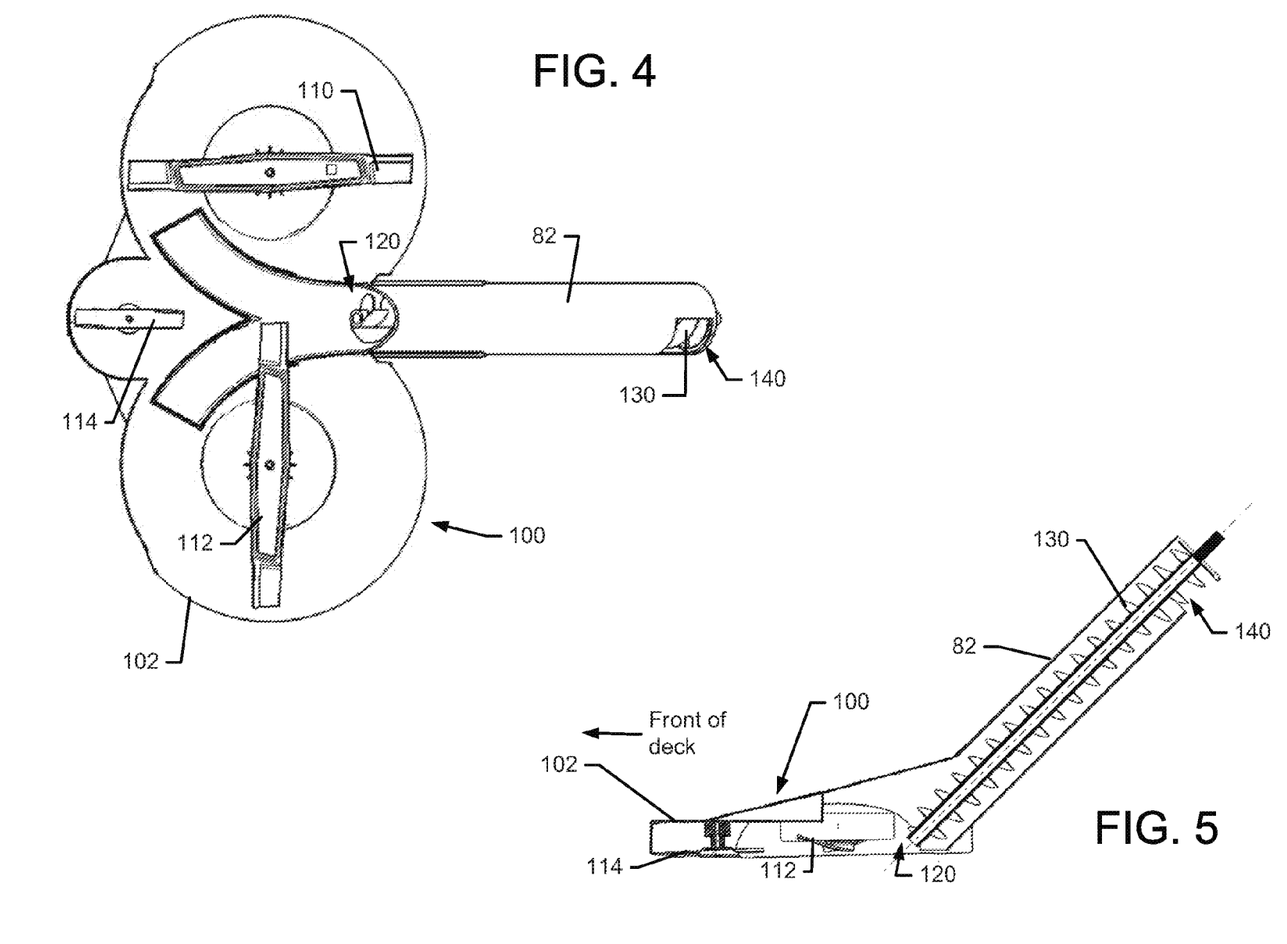
FIG. 4 illustrates a bottom view of a cutting deck of one embodiment with a transport mechanism according to an example embodiment.
FIG. 5 illustrates a partially cut away side view of the cutting deck and transport mechanism of FIG. 4 according to an example embodiment.

The auger within the auger assembly 80 could be actively or passively fed with clippings in various different embodiments. FIGS. 4-7 illustrate two examples of radial passive arrangements for embodying the auger assembly 80. In this regard, FIG. 4 illustrates a bottom view of a cutting deck 100 of one embodiment with a transport mechanism according to an example embodiment. The cutting deck 100 should be understood to be an example of the cutting deck 50 of FIGS. 1-3. FIG. 5 illustrates a partially cut away side view of the cutting deck 100 and transport mechanism of FIG. 4 according to an example embodiment. As shown in FIGS. 4 and 5, the cutting deck 100 may include a housing 102 and three blades. In this example, a first blade 110 may rotate counter to the direction in which a second blade 112 rotates within the housing 102. The first blade 110 may rotate counterclockwise while the second blade 112 is rotating clockwise. A third blade 114 may also be provided, but is not required. In this arrangement, the pickup point 120 for the auger 130 may be disposed at a center and rear portion of the cutting deck 100. Thus, the rotation of the first and second blades 110 and 112 may tend to feed clippings into the pickup point 120 for the auger 130 to intake the clippings for transport through the chute 82 to the emptying point 140, which is disposed inside the bagging attachment 12. Given that the pickup point 120 is disposed substantially in the plane in which the first and second blades 110 and 112 rotate proximate to a radial limit of the extension of each blade, this arrangement may be referred to as a passive radial arrangement. Within this context, passive feeding of the auger assembly 80 should be understood as transporting clippings directly from the blades to the pickup point 120 without any further conveyance providing components between the blades and the pickup point 120. Although not required, in some cases, the housing 102 may be configured to include vanes or other features to facilitate directing clippings into the pickup point 120.

Figures 6, 7:
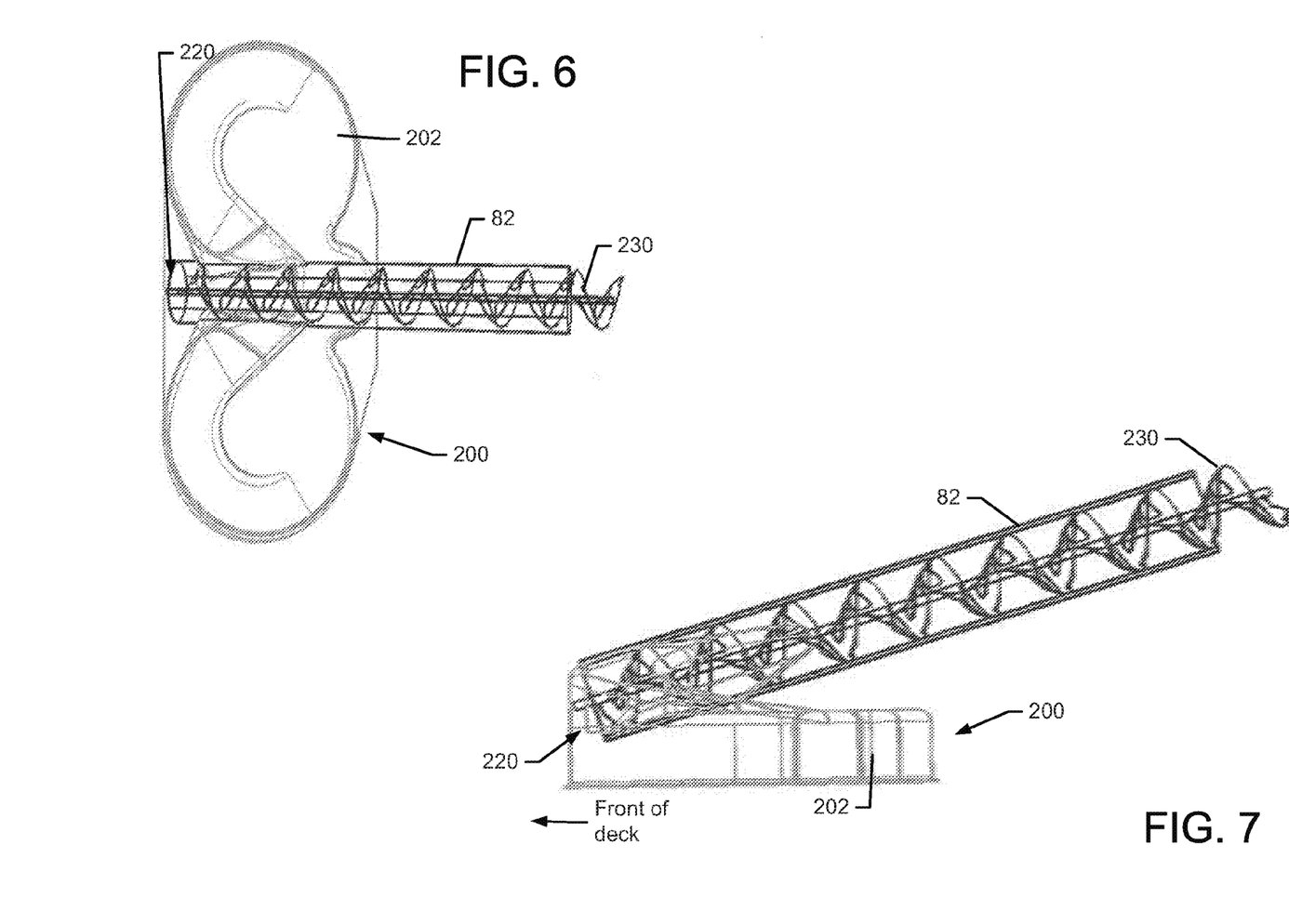
FIG. 6 illustrates a bottom view of a cutting deck of an example embodiment with a transport mechanism according to another example embodiment.
FIG. 7 illustrates a partially cut away side view of the cutting deck and transport mechanism of FIG. 6 according to an example embodiment.

As mentioned above, the pickup point 120 could alternatively be placed in another location. In this regard, for example, FIGS. 6 and 7 illustrate an alternative passive radial arrangement. In FIGS. 6 and 7, an alternative cutting deck 200 is provided to include a housing 202 that may house multiple blades (not shown). The arrangement of FIGS. 6 and 7 may be similar to that described above in reference to FIGS. 4 and 5 except that the pickup point 220 may be at a front end of the cutting deck 200 instead of being at a rear portion thereof. The auger 230 may again rotate to move clippings to the bagging attachment 12. However, as can be appreciated by comparing the angles at which the chute 82 lies relative to the plane of the cutting decks 100 and 200 in FIGS. 5 and 7, respectively, by placing the pickup point 220 at the front of the cutting deck 200, a smaller angle of transport can be achieved.

Although both examples shown in FIGS. 4-7 show the pickup points being disposed in the center of the cutting decks for passive pickup, it should be appreciated that the pickup point could be located at a point other than at the center of the cutting deck (i.e., along the longitudinal centerline of the riding lawn care vehicle 10). Use of two blades spinning in counter direction may make such location advantageous. However, if one blade or some other blade arrangement is used, it may be desirable to use a different arrangement (e.g., having a pickup point at one side or the other). If the pickup point is located along the side of the cutting deck, it should be appreciated that the chute 82 may also not pass along the longitudinal centerline of the riding lawn care vehicle 10. Instead, for example, the pickup point and the chute may be disposed to one side of the riding lawn care vehicle 10. In such an example, it may be expected that the chute 82 would extend along a direction that remains parallel to the longitudinal centerline of the riding lawn care vehicle 10. However, the chute 82 itself may be spaced apart from the longitudinal centerline of the riding lawn care vehicle 10 in that example case. Some embodiments could employ different segments of chute that change directions, but this would typically require multiple augers as well. As yet another alternative, the chute 82 could extend at an angle relative to the longitudinal centerline of the riding lawn care vehicle 10.

Figures 8, 9:
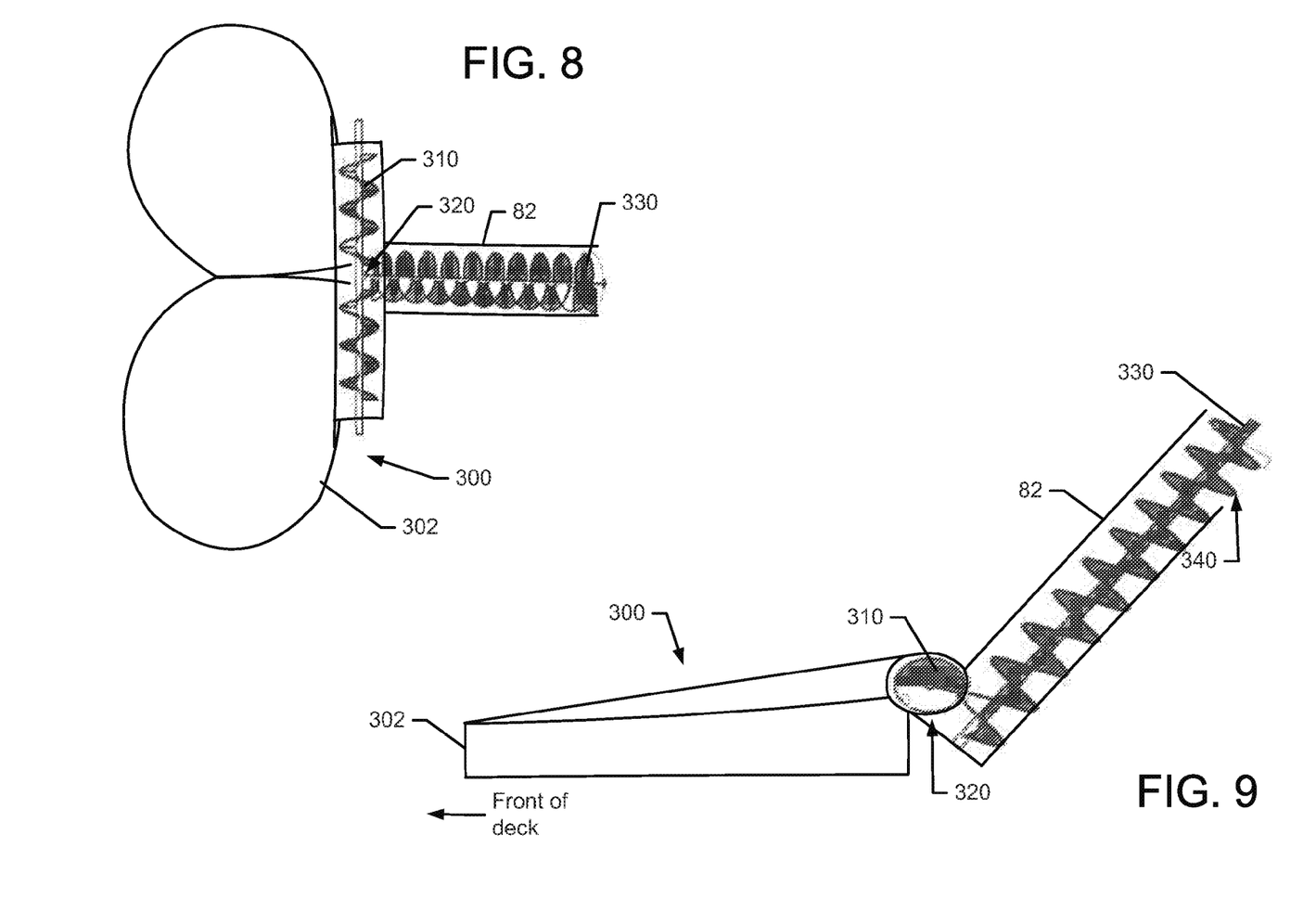
FIG. 8 illustrates a bottom view of a cutting deck of an example embodiment with a transport mechanism according to yet another example embodiment.
FIG. 9 illustrates a partially cut away side view of the cutting deck and transport mechanism of FIG. 7 according to an example embodiment.

As an alternative to having the auger passively pickup clippings, an active feed system could be employed. In some embodiments the active feed system may be accomplished by feeding clippings into the pickup point. Although the feed system could likely be embodied in a number of different ways, it may be possible to provide an active feed system using another auger (e.g., a feed auger). Moreover, in one example embodiment a feed auger may be provided that lies substantially perpendicular to the direction of extension of the chute 82. FIGS. 8 and 9 illustrate such an example.

In this regard, as shown in FIGS. 8 and 9, a cutting deck 300 having a housing 302 that form yet another example of the cutting deck 50 is shown. However, a rear portion of the housing 302 is formed to accommodate a first auger 310 that may be reverse threaded at opposite sides of a transverse center thereof. The blades on both sides of the first auger 310 may therefore feed clippings passively received therein toward the transverse center at which location the pickup point 320 of a second auger 330 that is disposed within the chute 82 is provided. The second auger 330 may transport the clippings to an emptying point 340 at which the clippings may be provided into the bagging attachment 12.

Example embodiments that combine the articulated steering system with the motor 60 and bagging attachment 12 provided to be fixed to the front frame portion 42, while being suspended over the rear frame portion 44 may provide efficient grass collection while providing improved maneuverability. The use of an auger system (in the form of the auger assembly 80) to convey clippings from the cutting deck 50 located at the front portion of the riding lawn care vehicle 10 to the bagging attachment 12 at the rear portion of the riding lawn care vehicle 10 may enable the clippings to be reliably conveyed without clogging. In this regard, the length of the chute 82, which could become problematic with respect to clogging occurrence as the length increases, may not be a significant issue with the use of an auger. Moreover, in some cases, the conveyance via an auger may further compact the clippings so that the capacity of the bagging attachment 12 is effectively increased. The bagging attachment 12, when fed by the auger assembly 80, may therefore hold more grass than a bag or collection container of the same volume that is fed by other means. The need to manually clear the chute may be less likely, and the frequency of dumping of the bagging attachment 12 may also be reduced.

Figure 10:
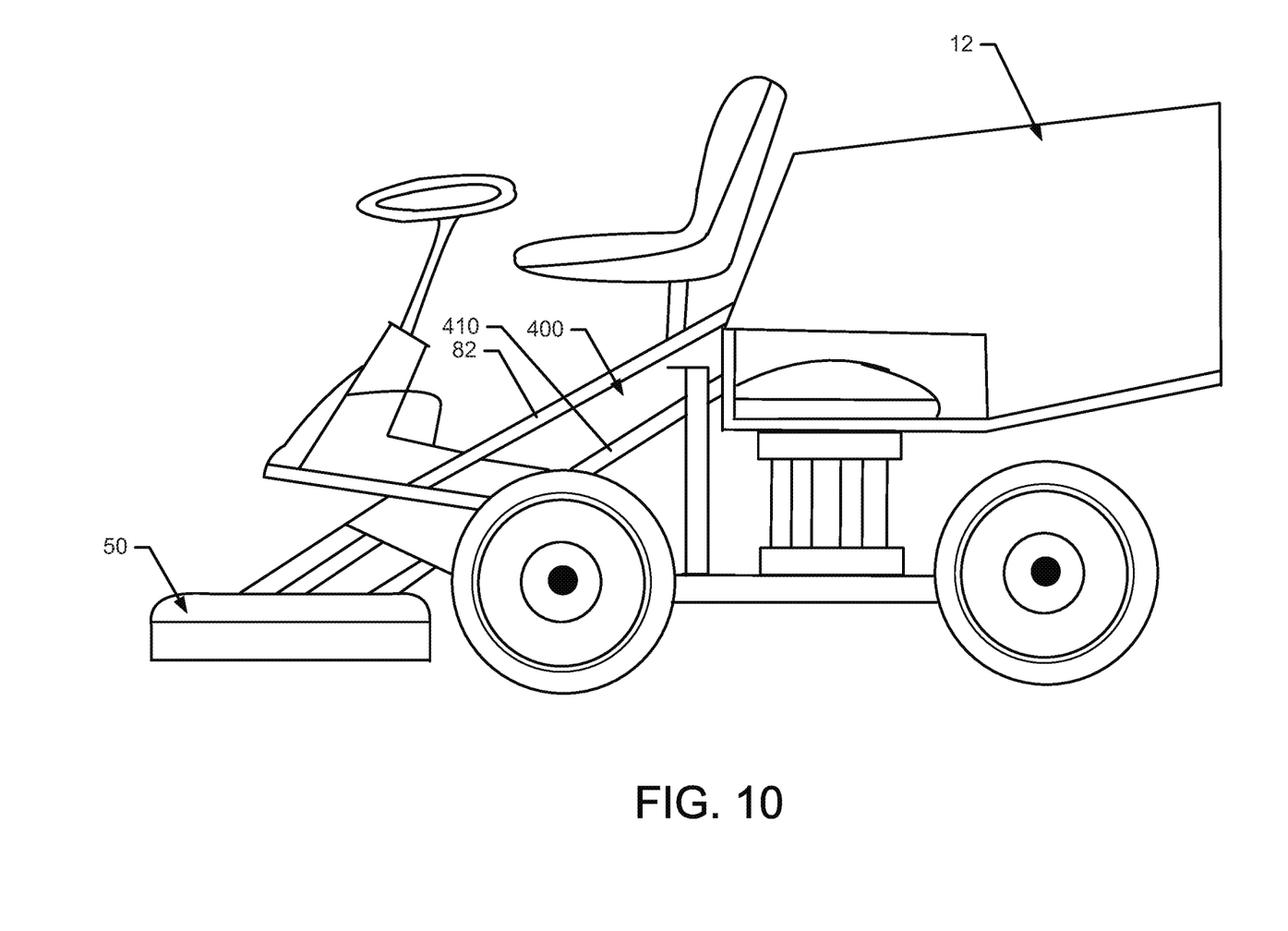
FIG. 10 illustrates a side view of a transport mechanism in accordance with an alternative example embodiment.

As mentioned above, the transport mechanism for conveying clippings from the cutting deck 50 to the bagging attachment 12 may alternatively be provided in the form of the belt conveyor assembly 400. FIG. 10 illustrates a side view of such a transport mechanism in accordance with an alternative example embodiment. The chute 82 may be provided as described above. However, a belt 410 may be located proximate to the bottom of the chute 82 to carry clippings up the chute 82 and into the bagging attachment 12. The belt 410 may be continuously or intermittently driven either by the engine of the riding lawn care vehicle 10 or by a separate engine.

Thus, example embodiments provide various different ways that a highly maneuverable riding lawn care vehicle can be provided without having to provide a flexible chute that may be prone to clogging. In this regard, some embodiments may provide a lawn care device that may include an articulated frame, a cutting deck, a collection container and a chute. The articulated frame may include a front frame portion to which front wheels are operably coupled and a rear frame portion to which rear wheels are operably coupled, the front frame portion and rear frame portions being operably coupled by an articulated joint. The cutting deck may house at least one blade and the cutting deck may be mounted to the front frame portion, forward of the front wheels. The collection container may collect material from the cutting deck and may be affixed to the front frame portion and suspended over the rear wheels. The chute may be operably coupling the cutting deck and the collection container to pass the material from the cutting deck to the collection container.

The lawn care device of some embodiments may include additional features that may be optionally added. For example, in some embodiments, (1) the chute extends substantially in a straight line between the cutting deck and the collection container. Additionally or alternatively, (2) the chute rises in elevation from the cutting deck to the collection container and is not rigidly fixed in either the cutting deck or in the collection container (e.g., the chute may "float"). Additionally or alternatively, (3) the collection container is disposed proximate to a motor of the lawn care device such that both the motor and the collection container remain fixed relative to the front frame portion when the rear frame portion rotates about the articulated joint. Additionally or alternatively, (4) the motor is suspended above the rear frame portion. Additionally or alternatively, (5) the lawn care device may include an auger assembly associated with the chute to convey the material between the cutting deck and the collection container. Additionally or alternatively, (6) the auger assembly may include an auger having a helical blade that is disposed within the chute where the auger transports the material from a pickup point at a first end of the chute to an emptying point within the collection container at an opposite end of the chute. Additionally or alternatively, (7) the pickup point is disposed at a longitudinal centerline of the lawn care device and the chute extends along the longitudinal centerline of the lawn care device. Additionally or alternatively, (8) the cutting deck houses a first blade and a second blade that rotate in opposing directions relative to each other, and the pickup point is disposed at a point radially equidistant from an axis of rotation of the first and second blades. Additionally or alternatively, (9) the pickup point may be disposed proximate to a forward portion or rear portion of the cutting deck. Additionally or alternatively, (10) the pickup point may be disposed spaced apart from a longitudinal centerline of the lawn care device and the chute extends parallel to and spaced apart from the longitudinal centerline of the lawn care device.

In some embodiments, any or all of (1) to (10) may be employed, and the auger passively receives the material at the pickup point responsive to operation of the at least one blade. In some embodiments, any or all of (1) to (10) may be employed, and the auger receives the material at the pickup point responsive to active feeding of the material into the pickup point. In some embodiments, any or all of (1) to (10) may be employed, and the auger receives the material at the pickup point responsive to active feeding of the material into the pickup point via a feed auger operably coupling the material from the cutting deck to the pickup point. In some embodiments, any or all of (1) to (10) may be employed, and the auger receives the material at the pickup point responsive to active feeding of the material into the pickup point, and wherein the feed auger extends in a direction substantially perpendicular to the direction of extension of the chute.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A lawn care device comprising:
    an articulated frame comprising a front frame portion to which front wheels are operably coupled and a rear frame portion to which rear wheels are operably coupled, the front and rear frame portions being operably coupled by an articulated joint;
    a cutting deck housing at least one blade, the cutting deck being mounted forward of the front wheels to the front frame portion;
    a motor selectively engaged with the cutting deck;
    a collection container for collecting material from the cutting deck, the collection container and the motor being affixed to the front frame portion and suspended over the rear frame portion, wherein the rear frame portion is rotatable about the articulated joint without corresponding rotation of the collection container and the motor; and
    a chute operably coupling the cutting deck and the collection container to pass the material from the cutting deck to the collection container.

2. The lawn care device of claim 1, wherein the chute extends substantially in a straight line between the cutting deck and the collection container.

3. The lawn care device of claim 2, wherein the chute rises in elevation from the cutting deck to the collection container.

4. The lawn care device of claim 1, wherein the collection container is disposed proximate to the motor of the lawn care device, the motor and the collection container remaining fixed relative to the front frame portion when the rear frame portion rotates about the articulated joint.

5. The lawn care device of claim 4, wherein the motor powers the rear wheels.

6. The lawn care device of claim 1, further comprising an auger assembly associated with the chute to convey the material between the cutting deck and the collection container.

7. The lawn care device of claim 6, wherein the auger assembly comprises an auger comprising a helical blade that is disposed within the chute, the auger transporting the material from a pickup point at a first end of the chute to an emptying point within the collection container at an opposite end of the chute.

8. The lawn care device of claim 7, wherein the pickup point is disposed at a longitudinal centerline of the lawn care device and the chute extends along the longitudinal centerline of the lawn care device.

9. The lawn care device of claim 8, wherein the cutting deck houses a first blade and a second blade that rotate in opposing directions relative to each other, and wherein the pickup point is disposed at a point radially equidistant from an axis of rotation of the first and second blades.

10. The lawn care device of claim 9, wherein the pickup point is disposed proximate to a forward portion of the cutting deck.

11. The lawn care device of claim 9, wherein the pickup point is disposed proximate to a rear portion of the cutting deck.

12. The lawn care device of claim 7, wherein the pickup point is disposed spaced apart from a longitudinal centerline of the lawn care device and the chute extends parallel to and spaced apart from the longitudinal centerline of the lawn care device.

13. The lawn care device of claim 7, wherein the auger passively receives the material at the pickup point responsive to operation of the at least one blade.

14. The lawn care device of claim 7, wherein the auger receives the material at the pickup point responsive to active feeding of the material into the pickup point.

15. The lawn care device of claim 7, wherein the auger receives the material at the pickup point responsive to active feeding of the material into the pickup point via a feed auger operably coupling the material from the cutting deck to the pickup point.

16. The lawn care device of claim 15, wherein the auger receives the material at the pickup point responsive to active feeding of the material into the pickup point, and wherein the feed auger extends in a direction substantially perpendicular to the direction of extension of the chute.

17. The lawn care device of claim 1, further comprising a belt conveyor assembly associated with the chute to convey the material between the cutting deck and the collection container.

18. The lawn care device of claim 17, wherein the belt conveyor assembly comprises a belt disposed in a bottom portion of the chute.

19. The lawn care device of claim 1, wherein the chute is not flexible and does not rotate responsive to rotation of the rear frame about the articulated joint.

20. A transport mechanism for operably coupling a cutting deck of a lawn care device to a collection container for collecting material responsive to operation of the cutting deck, the transport mechanism comprising:
   a chute operably coupling the cutting deck and the collection container to pass the material from the cutting deck to the collection container; and
   an auger assembly disposed within the chute to convey the material between the cutting deck and the collection container,
wherein the lawn care device comprises:
   a motor; and
   an articulated frame comprising a front frame portion to which front wheels are operably coupled and a rear frame portion to which rear wheels are operably coupled, the front and rear frame portions being operably coupled by an articulated joint, and
wherein the collection container and the motor are affixed to the front frame portion and suspended over the rear frame portion such that the rear frame portion is rotatable about the articulated joint without corresponding rotation of the collection container and the motor.

* * * * *